United States Patent
Kim et al.

(10) Patent No.: US 11,277,256 B2
(45) Date of Patent: Mar. 15, 2022

(54) CIPHERTEXT COMPARISON METHOD USING HOMOMORPHIC ENCRYPTION AND APPARATUS FOR PERFORMING THE SAME

(71) Applicant: SAMSUNG SDS CO., LTD., Seoul (KR)

(72) Inventors: Eun-Kyung Kim, Seoul (KR); Hyo-Jin Yoon, Seoul (KR); Young-Hyun Kim, Seoul (KR); Hee-Hyeon Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 184 days.

(21) Appl. No.: 16/661,371

(22) Filed: Oct. 23, 2019

(65) Prior Publication Data

US 2020/0136798 A1  Apr. 30, 2020

(30) Foreign Application Priority Data

Oct. 26, 2018  (KR) .......................... 10-2018-0128929

(51) Int. Cl.
*H04L 9/00* (2006.01)
*H04L 9/06* (2006.01)
(Continued)

(52) U.S. Cl.
CPC ............ *H04L 9/008* (2013.01); *H04L 9/0618* (2013.01)

(58) Field of Classification Search
CPC ......... H04L 9/008; H04L 9/0618; G06F 7/50; G06F 7/52
See application file for complete search history.

(56) References Cited

U.S. PATENT DOCUMENTS

| 10,075,288 B1 * | 9/2018 | Khedr ........................ H04L 9/30 |
| 2010/0246812 A1 * | 9/2010 | Rane ..................... H04L 9/3271 380/28 |

(Continued)

FOREIGN PATENT DOCUMENTS

| EP | 2237474 A1 * | 10/2010 | ........... H04L 9/3271 |
| EP | 2237474 A1 | 10/2010 | |

OTHER PUBLICATIONS

Cheon J.H., Han K., Kim A., Kim M., Song Y. (2018) Bootstrapping for Approximate Homomorphic Encryption. In: Nielsen J., Rijmen V. (eds) Advances in Cryptology—EUROCRYPT 2018. EUROCRYPT 2018. Lecture Notes in Computer Science, vol. 10820 . Springer, Cham. https://doi.org/10.1007/978-3-319-78381-9_14 (Year: 2018).*

(Continued)

*Primary Examiner* — Vu V Tran
(74) *Attorney, Agent, or Firm* — The PL Law Group, PLLC

(57) ABSTRACT

A ciphertext comparison method uses homomorphic encryption. An apparatus performs the ciphertext comparison method using the homomorphic encryption. The ciphertext comparison method using homomorphic encryption includes acquiring a first ciphertext obtained by encrypting first real-number data using a homomorphic evaluation algorithm and a second ciphertext obtained by encrypting second real-number data using the homomorphic evaluation algorithm, and generating a ciphertext for a result for comparison in size between the first real-number data and the second real-number data using homomorphic evaluation for the first ciphertext, the second ciphertext, and an approximation function for approximating a signum function.

6 Claims, 1 Drawing Sheet

(51) Int. Cl.
    *G06F 7/50*    (2006.01)
    *G06F 7/52*    (2006.01)

(56) References Cited

U.S. PATENT DOCUMENTS

2017/0180115 A1*  6/2017  Laine ................... H04L 9/0618
2019/0065974 A1*  2/2019  Michigami .......... G06N 3/0481

OTHER PUBLICATIONS

J.H.Cheon et al., "Homomorphic Encryption for Arithmetic of Approximate Numbers", International Conference on the Theory and Application of Cryptology and Information Security, pp. 409-437, 2017, https://doi.org/10.1007/978-3-319-70694-8_15.
J. H. Cheon et al., Bootstrapping for approximate homomorphic encryption. Cryptology ePrint Archive, Report 2018/153, 2018.
European Search Report For EP 19204790.0 dated Mar. 9, 2020 from European patent office in a counterpart European patent application.

* cited by examiner

CIPHERTEXT COMPARISON METHOD USING HOMOMORPHIC ENCRYPTION AND APPARATUS FOR PERFORMING THE SAME

CROSS-REFERENCE TO RELATED APPLICATION

This application claims priority to and the benefit of Korean Patent Application No. 10-2018-0128929, filed on Oct. 26, 2018, the disclosure of which is incorporated herein by reference in its entirety.

BACKGROUND

1. Field

Embodiments of the present disclosure relate to a homomorphic encryption technique.

2. Discussion of Related Art

The concept of homomorphic encryption capable of mathematical computation between encrypted data values has emerged and thus it is expected that many changes will be made in cryptographic paradigms. However, homomorphic encryption still has technical limitations and cannot be applied to various fields.

The fundamental problem with a conventional homomorphic encryption technique is that it is difficult to compare the sizes of two encrypted data values. In detail, the conventional homomorphic encryption technique has integer data and thus, in order to compare sizes of ciphertexts, uses a scheme of comparing ciphertexts bit by bit and analyzing a result of comparing all of the bits. However, when the plaintext data is in a real number form, there is a problem in that such a comparison scheme is inefficient.

SUMMARY

Embodiments of the present disclosure are directed to providing a ciphertext comparison method using homomorphic encryption and an apparatus for performing the same.

According to an aspect of the present disclosure, a ciphertext comparison method using homomorphic encryption is performed in a computing apparatus including one or more processors and a memory for storing one or more programs executable by the one or more processors and includes acquiring a first ciphertext obtained by encrypting first real-number data using a homomorphic encryption algorithm and a second ciphertext obtained by encrypting second real-number data using the homomorphic encryption algorithm, and generating a ciphertext for a result for comparison in size between the first real-number data and the second real-number data using homomorphic evaluation of the first ciphertext, the second ciphertext, and an approximation function for approximating a signum function.

The approximation function may be a function of approximating the signum function to a polynomial composed of addition and multiplication.

The generating of the ciphertext may include performing homomorphic evaluation of subtraction between the first real-number data and the second real-number data using the first ciphertext and the second ciphertext in an encrypted state and performing homomorphic evaluation of the approximation function using a result for the homomorphic evaluation of the subtraction to generate the ciphertext for the result of the size comparison.

The homomorphic encryption algorithm may be an approximate homomorphic encryption algorithm that supports homomorphic evaluation of addition, subtraction, and multiplication.

According to another aspect of the present disclosure, a ciphertext comparison apparatus using homomorphic encryption includes one or more processors, a memory, and one or more programs, wherein the one or more programs are stored in the memory and executed by the one or more processors, and the programs include instructions for acquiring a first ciphertext obtained by encrypting first real-number data using a homomorphic encryption algorithm and a second ciphertext obtained by encrypting second real-number data using the homomorphic encryption algorithm, and generating a ciphertext for a result for comparison in size between the first real-number data and the second real-number data using homomorphic evaluation of the first ciphertext, the second ciphertext, and an approximation function for approximating a signum function.

The approximation function may be a function approximating the signum function to a polynomial composed of addition and multiplication.

The generating of the ciphertext may include performing homomorphic evaluation of subtraction between the first real-number data and the second real-number data using the first ciphertext and the second ciphertext in an encrypted state and performing homomorphic evaluation of the approximation function using a result for the homomorphic evaluation of the subtraction to generate the ciphertext for the result of the size comparison.

The homomorphic encryption algorithm may be an approximate homomorphic encryption algorithm that supports homomorphic evaluation of addition, subtraction, and multiplication.

BRIEF DESCRIPTION OF THE DRAWINGS

The above and other aspects, features and advantages of the present disclosure will become more apparent to those of ordinary skill in the art by describing exemplary embodiments thereof in detail with reference to the accompanying drawings, in which.

DETAILED DESCRIPTION

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

In describing embodiments of the present disclosure, when it is determined that a detailed description of a known technique associated with the present disclosure would unnecessarily obscure the subject matter of the present disclosure, the detailed description will be omitted. Also, terms used herein are defined in consideration of the functions of the present disclosure and may be changed depending on a user, the intent of an operator, or a custom. Accordingly, the terms must be defined based on the following overall description of this specification. The terminology used herein is only for the purpose of describing embodiments of the present disclosure and is not restrictive. The singular forms "a," "an," and "the" are intended to include the plural forms as well, unless the context clearly indicates otherwise. It should be understood that the terms "comprises," "comprising," "includes,": and/or "including" specify the presence of stated features, integers, steps, operations, elements, components, and/or groups thereof when used herein, but do not preclude the presence or addition of one or more other features, integers, steps, operations, elements, components, and/or groups thereof.

Figure 1:
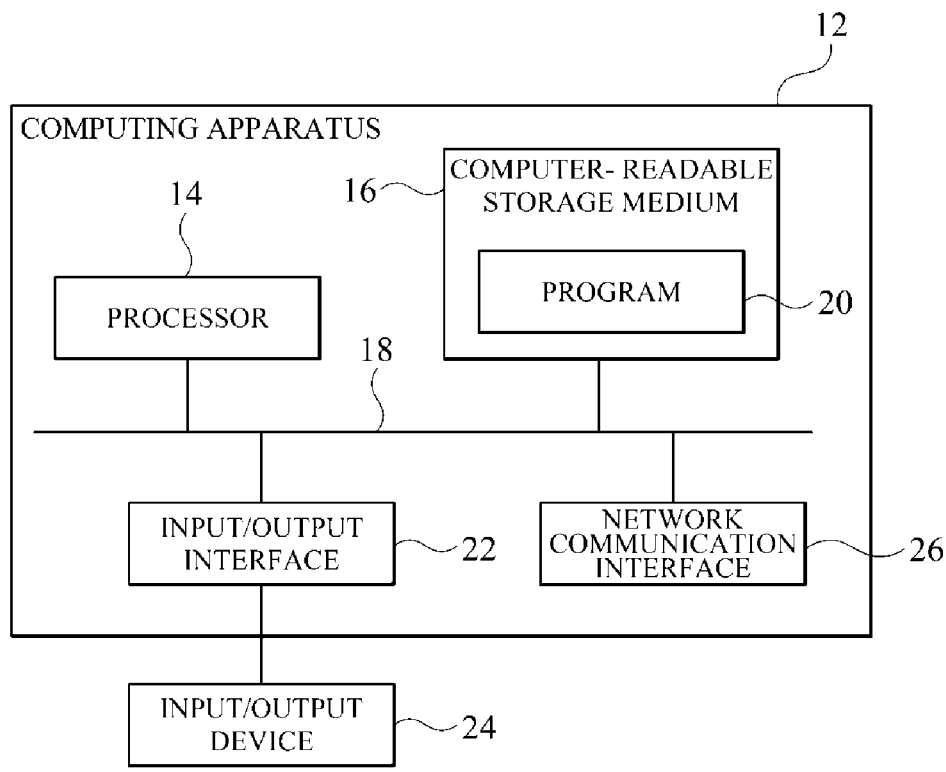
FIG. 1 is a block diagram illustrating a computing environment including a computing apparatus suitable for use in example embodiments.

FIG. 1 is a block diagram illustrating a computing environment including a computing apparatus suitable for use in example embodiments. In the illustrated embodiment, each component may have a function and capability that differs from those described below, and an additional component may be included in addition to those in the following description.

As shown, a computing environment 10 includes a computing apparatus 12. According to an embodiment, the computing apparatus 12 may be an apparatus for performing a ciphertext comparison method to be described below.

The computing apparatus 12 includes at least one processor 14, a computer-readable storage medium 16, and a communication bus 18. The processor 14 may enable the computing apparatus 12 to operate according to the aforementioned example embodiment. For example, the processor 14 may execute one or more programs stored in the computer-readable storage medium 16. The one or more programs may include one or more computer executable instructions which may be configured to enable the computing apparatus 12 to perform operations according to an example embodiment when they are executed by the processor 14.

The computer-readable storage medium 16 is configured to store computer-executable instructions, program codes, program data, and/or other suitable forms of information. The program 20 stored in the computer-readable storage medium 16 includes a set of instructions executable by the processor 14. In an embodiment, the computer-readable storage medium 16 may be a memory (a volatile memory such as a random access memory, a non-volatile memory, or an appropriate combination thereof), one or more magnetic disk storage devices, optical disk storage devices, flash memory devices, other forms of storage media accessible by the computing apparatus 12 and configured to store desired information, or a suitable combination thereof.

The communication bus 18 connects the processor 14, the computer-readable storage medium 16, and other various components of the computing apparatus 12 to one another.

The computing apparatus 12 may also include one or more input/output interfaces 22 that provide an interface for one or more input/output devices 24 and one or more network communication interfaces 26. The input/output interfaces 22 and the network communication interfaces 26 are connected to the communication bus 18. The input/output devices 24 may be connected to other components of the computing apparatus 12 through the input/output interfaces 22. For example, the input/output devices 24 may include input devices such as a pointing device (a mouse or a track pad), a keyboard, a touch input device (a touch pad or a touch screen), a voice or sound input device, and various kinds of sensor devices and/or photographing devices and output devices such as a display device, a printer, a speaker, and/or a network card. For example, the input/output devices 24 may be included in the computing apparatus 12 as components that form the computing apparatus 12 and may be connected to the computing apparatus 12 as separate devices distinct from the computing apparatus 12.

Figure 2:
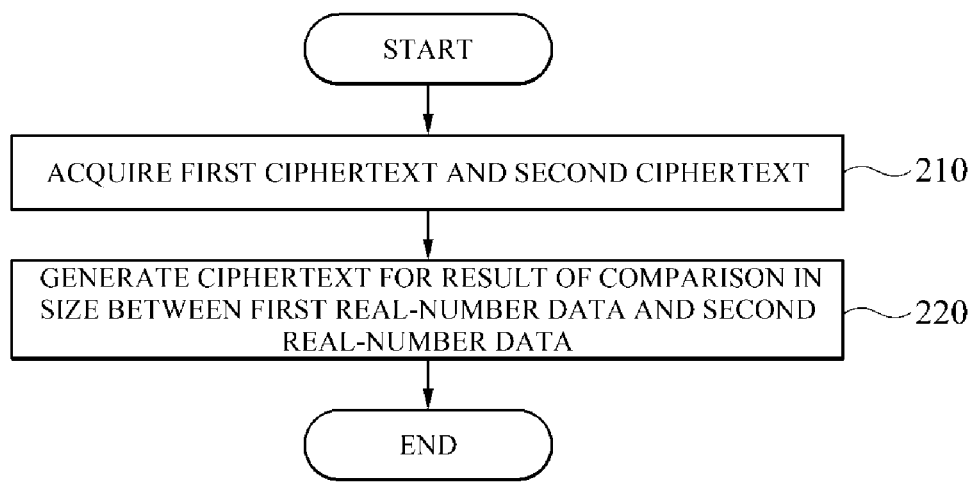
FIG. 2 is a flowchart showing a ciphertext comparison method using homomorphic encryption according to an embodiment of the present disclosure.

FIG. 2 is a flowchart showing a ciphertext comparison method using homomorphic encryption according to an embodiment of the present disclosure.

The steps shown in FIG. 2 may be performed by the computing apparatus 12.

Referring to FIG. 2, first, the computing apparatus 12 acquires a first ciphertext obtained by encrypting first real-number data and a second ciphertext obtained by encrypting second real-number data (210). In this case, the first ciphertext and the second ciphertext are generated through encryption using a homomorphic encryption algorithm.

Meanwhile, the first ciphertext and the second ciphertext may be generated by the same device or different devices. Also, the computing apparatus 12 may receive ciphertexts directly from devices that have generated the ciphertexts or may acquire ciphertexts from a separate data base where the ciphertexts have been stored.

Meanwhile, the homomorphic encryption algorithm refers to an encryption algorithm capable of computing a ciphertext in an encrypted state to generate a ciphertext for a result of computing plaintext data. In detail, the homomorphic encryption algorithm is an encryption algorithm capable of performing homomorphic evaluation Eval(f,Enc(a)) on a function f using a ciphertext Enc(a) in an encrypted state as shown in the following Equation 1 and thus generating a ciphertext Enc(f(a)) for a result f(a) of performing evaluation of the function f using a plaintext a.

$$\mathrm{Eval}(f, \mathrm{Enc}(a)) \rightarrow \mathrm{Enc}(f(a)).$$ [Equation 1]

Meanwhile, according to an embodiment of the present disclosure, the homomorphic encryption algorithm may be, for example, a homomorphic encryption algorithm that supports homomorphic evaluation of addition, subtraction, and multiplication, such as an approximate homomorphic encryption algorithm disclosed in "J. H. Cheon, A. Kim, M. Kim, and Y. Song. Homomorphic encryption for arithmetic of approximate numbers. In Advances in Cryptology-ASIACRYPT 2017: 23rd International Conference on the Theory and Application of Cryptology and Information Security, pages 409-437.", "J. H. Cheon, K. Han, A. Kim, M. Kim, and Y. Song. Bootstrapping for approximate homomorphic encryption. Cryptology ePrint Archive, Report 2018/153, 2018," or the like.

In detail, the above-described approximate homomorphic encryption algorithm is composed of the following four algorithms, and the first ciphertext and the second ciphertext may be ciphertexts generated using the following algorithm Enc(pk,m).

(1) KeyGen($1^\lambda$)→(pk,sk,evk): a public key pk, a secret key sk, and an evaluation key evk are generated to have a stability parameter $\lambda$.

(2) Enc(pk,m)→c: a ciphertext c for plaintext data m is generated using pk.

(3) Eval(evk,f,c)→c*: a ciphertext c* for an approximate value f(m)+e of f(m) is generated from a ciphertext c* using an evaluation key evk (here, e is a very small calculation error).

(4) Dec(sk,c*)→m: a ciphertext c* is decrypted using the secret key sk, and f(m)+e is output.

Meanwhile, an available homomorphic encryption algorithm according to an embodiment of the present disclosure is not limited to the above-described approximate homomorphic encryption algorithm, and any type of homomorphic encryption algorithm can be used as long as it is a homomorphic encryption algorithm that supports homomorphic evaluation of addition, subtraction, and multiplication.

When the first ciphertext and the second ciphertext are acquired, the computing apparatus 12 generates a ciphertext for a result of comparison in size between the first real-number data and the second real-number data using homomorphic evaluation of the first ciphertext, the second ciphertext, and an approximation function for approximating a signum function (220).

In detail, the computing apparatus 12 may perform homomorphic evaluation of subtraction between the first real-number data and the second real-number data using the first ciphertext and the second ciphertext in an encrypted state. Also, the computing apparatus 12 may perform homomorphic evaluation of an approximation function using the homomorphic evaluation result for the difference between the first real-number data and the second real-number data to generate the ciphertext for the result of comparison in size between the first real-number data and the second real-number data.

Meanwhile, the signum function may be defined as Equation 2 below:

$$\text{sgn}(x) = \begin{cases} 1 & \text{if } x > 0 \\ 0 & \text{if } x = 0 \\ -1 & \text{if } x < 0 \end{cases} \quad [\text{Equation 2}]$$

Also, according to an embodiment of the present disclosure, the approximation function for the signum function defined as Equation 2 may be a function for approximating the signum function to a polynomial form represented by addition and multiplication with respect to x.

For example, an approximation function $\text{sgn}_{approx}(x)$ obtained by approximating a signum function $\text{sgn}(x)$ to a polynomial is shown in Equation 3 below:

$$\text{sgn}(x) \approx \text{sgn}_{approx}(x) \quad [\text{Equation 3}]$$

The computing apparatus 12 according to an embodiment of the present disclosure may generate the ciphertext for the result of the comparison in size between the first real-number data and the second real-number data using the homomorphic evaluation algorithm of the above-described approximate homomorphic encryption algorithm (i.e., Eval (evk,f,c)) as shown in Equation 4 below:

$$\text{Eval}(\text{evk}, \text{sgn}_{approx}(x-y), \text{Enc}(pk,a), \text{Enc}(pk,b)) \rightarrow \text{Enc}(pk, \text{sgn}_{approx}(a-b)) \quad [\text{Equation 4}]$$

where a is the first real-number data, b is the second real-number data, Enc(pk,a) is the first ciphertext, Enc(pk,b) is the second ciphertext, and $\text{Enc}(pk, \text{sgn}_{approx}(a-b))$ is a ciphertext for a result value obtained by applying a−b to $\text{sgn}_{approx}(x)$.

Also, $\text{Enc}(pk, \text{sgn}_{approx}(a-b))$ may satisfy Equation 5 below:

$$\text{Enc}(pk, \text{sgn}_{approx}(a-b)) = \begin{cases} \text{Enc}(pk, 1+e) & \text{if } x > 0 \\ \text{Enc}(pk, 0+e) & \text{if } x = 0 \\ \text{Enc}(pk, -1+e) & \text{if } x < 0 \end{cases} \quad [\text{Equation 5}]$$

where e is a very small error value.

Meanwhile, in the above-described example, the homomorphic evaluation of the approximation function is illustrated as being performed using the homomorphic evaluation algorithm of the approximate homomorphic encryption algorithm. In addition to the above example, however, the homomorphic evaluation of the approximation function may be performed using various types of homomorphic evaluation algorithms of the homomorphic encryption algorithm that can support homomorphic evaluation of addition, subtraction, and multiplication.

In FIG. 2, the ciphertext comparison method has been described as having a plurality of steps. However, at least some of the steps may be performed in a changed order, performed in combination with another step, omitted, divided into sub-steps and then performed, or performed in addition to one or more steps that are not shown.

According to the embodiments of the present disclosure, a ciphertext for a result of comparison in size of plaintext data values through homomorphic evaluation of an approximation function for approximating a signum function may be generated, and thus efficient size comparison is possible.

Although the disclosure has been described with reference to exemplary embodiments, it will be understood by those skilled in the art that various changes may be made without departing from the spirit or scope of the disclosure. Accordingly, the scope of the present disclosure is not construed as being limited to the described embodiments but is defined by the appended claims as well as equivalents thereto.

What is claimed is:

1. A ciphertext comparison method using homomorphic encryption, the method being performed in a computing apparatus including one or more processors and a memory for storing one or more programs executable by the one or more processors; the ciphertext comparison method comprising:

acquiring a first ciphertext obtained by encrypting first real-number data using a homomorphic encryption algorithm and a second ciphertext obtained by encrypting second real-number data using the homomorphic encryption algorithm; and generating a ciphertext for a result for comparison in size between the first real-number data and the second real-number data using homomorphic evaluation of the first ciphertext, the second ciphertext, and an approximation function for approximating a signum function, wherein the generating of the ciphertext comprises:

performing homomorphic evaluation of subtraction between the first real-number data and the second real-number data using the first ciphertext and the second ciphertext in an encrypted state; and performing homomorphic evaluation of the approximation function using a result for the homomorphic evaluation of the subtraction to generate the ciphertext for the result of the size comparison.

2. The ciphertext comparison method of claim 1, wherein the approximation function is a function of approximating the signum function to a polynomial composed of addition and multiplication.

3. The ciphertext comparison method of claim 1, wherein the homomorphic encryption algorithm is an approximate homomorphic encryption algorithm that supports homomorphic evaluation of addition, subtraction, and multiplication.

4. A ciphertext comparison apparatus using homomorphic encryption, the apparatus comprising:

one or more processors;

a memory; and one or more programs, wherein the one or more programs are stored in the memory and executed by the one or more processors; and the programs comprise instructions for:

acquiring a first ciphertext obtained by encrypting first real-number data using a homomorphic encryption algorithm and a second ciphertext obtained by encrypting second real-number data using the homomorphic encryption algorithm; and generating a ciphertext for a result for comparison in size between the first real-number data and the second real-number data using homomorphic evaluation of the first ciphertext, the second ciphertext, and an approximation function for approximating a signum function, wherein the generating of the ciphertext comprises:

performing homomorphic evaluation of subtraction between the first real-number data and the second real-number data using the first ciphertext and the second ciphertext in an encrypted state; and performing homomorphic evaluation of the approximation function using a result for the homomorphic evaluation of the subtraction to generate the ciphertext for the result of the size comparison.

5. The ciphertext comparison apparatus of claim 4, wherein the approximation function is a function of approximating the signum function to a polynomial composed of addition and multiplication.

6. The ciphertext comparison apparatus of claim 4, wherein the homomorphic encryption algorithm is an approximate homomorphic encryption algorithm that supports homomorphic evaluation of addition, subtraction, and multiplication.

* * * * *